United States Patent [19]

Takigami

[11] Patent Number: 4,982,072
[45] Date of Patent: Jan. 1, 1991

[54] DRIVER LICENSE CHECK SYSTEM WITH IC CARD AND METHOD THEREFOR

[75] Inventor: Hiroshi Takigami, Hadano, Japan

[73] Assignee: Hitachi, Ltd., Tokyo, Japan

[21] Appl. No.: 153,139

[22] Filed: Feb. 8, 1988

[30] Foreign Application Priority Data

Feb. 9, 1987 [JP] Japan .................................. 62-26428

[51] Int. Cl.⁵ .............................................. G07B 15/02
[52] U.S. Cl. ..................................... 235/384; 235/382; 340/825.31; 307/10.4
[58] Field of Search ................ 235/375, 380, 382, 384, 235/492; 340/825.31; 307/10.4

[56] References Cited

U.S. PATENT DOCUMENTS 4,673,914 6/1987 Lee ........................................ 307/10.4
4,795,898 1/1989 Bernstein et al. ................. 235/380 X
4,796,151 1/1989 Asada et al. ..................... 307/10.4 X

FOREIGN PATENT DOCUMENTS 58-94049 4/1983 Japan .

*Primary Examiner*—David L. Trafton
*Attorney, Agent, or Firm*—Fay, Sharpe, Beall, Fagan, Minnich & McKee

[57] ABSTRACT

A driver's license being IC-carded, informations stored in the driver's license card is read out to detect matched or mismatched relations with a driver's license number set beforehand. The excess of penalty points of violation, uninsertion of the card, etc., and the permission and prohibition of starting an engine are decided on the basis of the result of the detection. Besides, the information stored in the driver's license card is made rewritable by using a keyboard and others provided in a driver's license card controller which is installed in a government office administrating driver's license, such as a police office, and thus the quick renewal and alteration of driver's license are enabled.

9 Claims, 1 Drawing Sheet

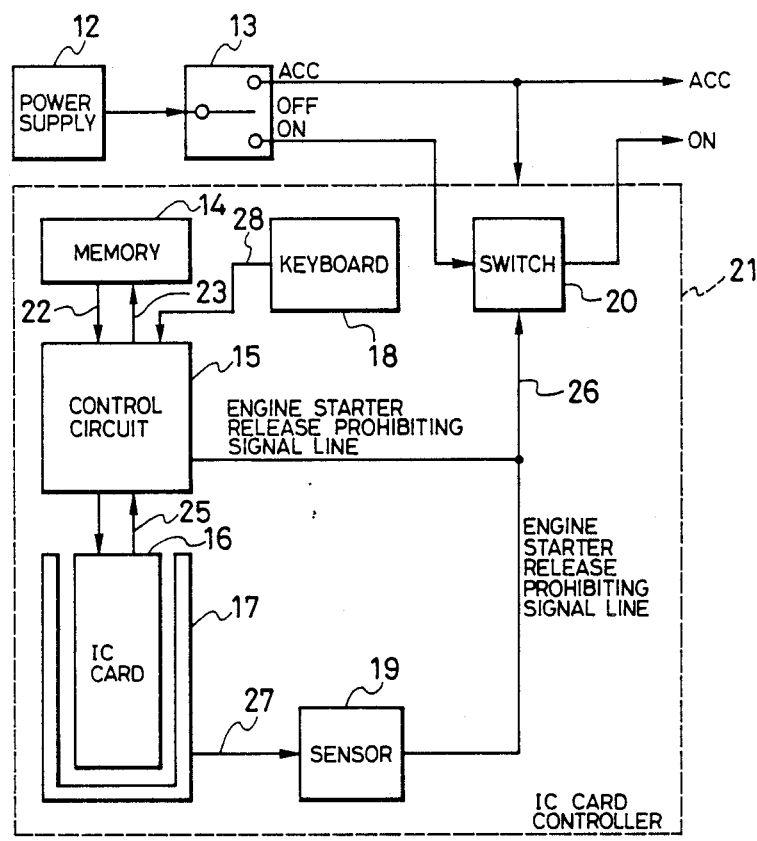

DRIVER LICENSE CHECK SYSTEM WITH IC CARD AND METHOD THEREFOR

BACKGROUND OF THE INVENTION

1. Field of the Invention

The present invention relates to the technique for utilizing an IC card, and particularly to a driver license check system with the IC card and a method therefor which can be utilized suitably for the prevention of violation of traffic law, the improvement in the security of vehicles, the quick renewal and alteration of a driver's license, etc.

2. Description of the Prior Art

As for a prior art relating to the IC card and the matters relevant thereto, the technique described in the Official Gazette on Japanese Patent Laid-Open No. 94049/1983 and others has been known, for instance. The IC card of this kind is constructed by forming a microprocessor, a memory for storing a control program therefor, a memory for storing data and a series-parallel converter on the same chip and by accommodating them in a card provided with an external input-output terminal, and it is so designed as to receive data from outside through the series-parallel converter, store necessary data in an internal memory element and deliver requested data to the outside. The utilization of such an IC card as described above is proceeding in various fields, but this card has not been utilized heretofore for a driver license check system for automobiles.

A conventional driver license check system has problems that it can not prevent a driver from driving a vehicle without carrying his license or from driving it illegally while penalty points of violation of the driver exceeds the limit of permission, and also it has a problem that the vehicle is ready to be stolen since the engine can be started easily by other persons. Furthermore, there is a problem that the renewal, alteration or the like of the driver's license requires much time.

SUMMARY OF THE INVENTION

An object of the present invention is to furnish a driver license check system with an IC card and a method therefor which make it possible to settle the above-stated problems of the prior art by the utilization of the IC card, and thus enable the prevention of illegal driving, the improvement in the security of vehicles, and also the quick renewal and alteration of a driver'-license. For this purpose, in the driver license check system utilizing the IC card, according to the present invention, the driver's license is constructed as an IC card having a storage means to store information on said driver's license, and a driver's license card control means is provided in a vehicle to read out the aforesaid stored pieces information on the driver's license, to detect whether the read pieces of information correspond to predetermined conditions or not, and to decide the operation of devices in said vehicle.

BRIEF DESCRIPTION OF THE DRAWINGS

FIG. 1 is a block diagram of a driver's license card controller used for the system of the present invention, and FIG. 2 is an illustration of a memory map of a memory in a driver's license card.

DETAILED DESCRIPTION OF THE PREFERRED EMBODIMENT

The foregoing and other objects, advantages, manner of operation and novel features of the present invention will be understood from the following detailed description when read in connection with the accompanying drawings.

One embodiment of a driver license check system with an IC card according to the present invention will be described in detail hereunder on the basis of the drawings.

FIG. 1 is a block diagram of a driver's license card controller used for the system of the present invention, and FIG. 2 is an illustration of a memory map of a memory in a driver's license card. In FIG. 1, numeral 12 denotes a battery, 13 a key, 14 a readable-writable memory, 15 a control circuit, 16 a driver's license card, 17 a member for receiving an IC card inserted, 18 a keyboard, 19 a sensor for detecting uninsertion of the IC card, 20 a switch, and 21 a driver's license card controller.

The driver's license card controller 21 is constructed, as shown in FIG. 1, of the member 17 for receiving an IC card which is inserted into the driver's license card 16; the sensor 19 for detecting uninsertion of the IC card which detects that the IC card 16 is not inserted into said member 17; the readable-writable memory 14 which stores the driver's license number of a driver who may drive legally, an engine starter release prohibiting condition, etc.; the keyboard 18; the control circuit 15 which is connected to the driver's license card 16, the memory 14 and the keyboard 18 and conducts the writing, reading and processing of informations; and the switch 20 which controls a power supply line of an engine to be OFF in response to an engine starter release prohibiting signal sent from the sensor 19 or the control circuit 15. This driver's license card controller 21 is operated by a power of the battery 12 supplied from an accessory position ACC of the key 13, and controls, by the switch 20, the power supply line of the engine on the occasion when the key 13 is in an ON position.

The driver's license card 16 consists of an IC card, and on one surface thereof, the same items with those in a conventional driver's license may be noted visibly. For instance, a liquid crystal display element of the like may be provided thereon. An internal memory provided in the card has a memory map as shown in FIG. 2 and stores prescribed items therein. In more detail, the internal memory has eleven storage areas in all: a nationality and domicile storing area 1, an address storing area 2, a name storing area 3, a date-of-birth storing area 4, a driver's license number storing area 5, a date-of-issue storing area 6, a vehicle class storing area 7, a date-for-renewal storing area 8, a restricting conditions storing area 9, a penalty-points-of-violation storing area 10, and a microprogram storing area 11 for controlling a microprocessor in the card.

A description will be made hereunder on the operation of the system of one embodiment of the present invention which is constructed as described above.

First, the key 13 is set at the accessory position ACC, and thereby a power is supplied from the battery 12 to the driver's license card controller 21, so as to start the operation. If the driver's license card 16 is not inserted into the member 17 for receiving the card, on the occasion, the sensor 19 for detecting uninsertion of an IC card detects the uninsertion of the card from a signal sent from the member 17 through a card insertion monitoring line 27, and delivers an engine starter release prohibiting signal to an engine starter release prohibiting signal line 26. Thereby the switch 20 is controlled to be in an OFF state, and consequently an engine receiving a power supply through this switch 20, which is not shown in the figure, is put in a state that it is disconnected from the power supply. Therefore it can not be started. Accordingly, the vehicle can not run, unless the driver's license card 16 is inserted into the member 17.

When the driver's license card 16 is set in the member 17, the sensor 19 for detecting uninsertion of the IC card 19 does not emit the engine starter release prohibiting signal. In this case, the control circuit 15 reads out a driver's license number, an engine starter release prohibiting condition, etc. registered beforehand in the memory 14, through a read line 22, while reading out information in the card 16 through a read line 25. The control circuit 15 makes a comparison between the driver's license number, the prohibiting condition, etc. read out of the memory 14 and the driver's license number and other pieces of information read out of the driver's license card 16, and delivers the engine starter release prohibiting signal in the case either when there is a mismatch between the driver's license numbers in the memory and the card, or when there exists such a prohibiting condition that information on an aggregate value of penalty points of violation, read out of the driver's license card 16, shows that the points exceed a stipulated limit. This signal makes it impossible to drive the vehicle even when the driver's license card 16 is inserted in the member 17 for receiving the card, if the driver's license number in the card is not in accord with the driver's license number in the memory 14, in other words, if the driver's license number of a person having inserted the card in the member 17 is not registered beforehand in the memory 14 as confirming that the person is permitted to drive the vehicle, and thus the driving of the vehicle by other persons can be prevented. Even when an authentic driver's license card 16 is inserted in the member 17, it is impossible to drive the vehicle as well if there exists such a prohibiting condition that the information on an aggregate value of penalty points of violation shows that the points exceeds a stipulated limit.

The aforesaid memory 14 stores beforehand the driver's license number, the prohibiting conditions, etc. of the owner of the vehicle or a person designated by the owner, for instance, and it is so protected that no writing can be made therein easily even by using the keyboard 18 shown in the figure. As to the writing or rewriting of the driver's license number in the memory 14, a method wherein it can be made therein through a line 23 when a code number known only by the owner of a vehicle is inputted from the keyboard 18, or a method wherein it can be made only by the seller of the vehicle on the occasion of purchase, for instance, may be adopted.

In the case when the vehicle is borrowed and driven by another person, it can be run by inputting the driver's license number of the owner of the vehicle stored in the memory 14 from the keyboard 18 to the control circuit 15 through a line 28.

Concretely, a driver, the borrower of the vehicle, inserts the driver's license card 16 of his own into the member 17 for receiving the card, and subsequently inputs, from the keyboard 18, the driver's license number of the owner of the vehicle which is set beforehand in the memory 14. The control circuit 15 prohibits the delivery of the engine starter release prohibiting signal when the driver's license number stored in the memory 14 and the driver's license number inputted from the keyboard 18 are identical with each other, while controlling the delivery of prohibition of said prohibiting signal in accordance with the presence or absence of the excess of penalty points of violation beyond a stipulated limit, in response to the information read out of the driver's license card of the driver. In this way, the driver can run the vehicle he has borrowed, unless his card shows the excess of penalty points of violation or other prohibiting conditions.

The driver's license card controller 21 of FIG. 1, which is mounted on a vehicle, has a construction wherein the control circuit 15 is provided with a function of prohibiting the writing in the driver's license card 16, for instance, so as to prevent the alteration or renewal of the pieces of information stored in the card 16. A function of writing or rewriting pieces of information in this driver's license card 16 is constructed in the same way as in the case of FIG. 1, and it is provided only in the driver's license card controller 21 installed in a government office administrating driver's licenses, such as a police office. The driver's license card controller 21 in this case is constructed to be used exclusively for reading information from and writing the same in the driver's license card 16. Said controller is not provided with a function of controlling the opening and closure of the key.

By using this driver's license card controller 21 installed in the government office administrating driver's license, the aggregating addition and renewal of the pieces of information on penalty points of violation can be implemented by a microprocessor incorporated in the driver's license card 16 formed of an IC card, and besides, the renewal, alteration, etc. of the driver's license card can be implemented quickly.

While the prevention of illegal driving by a person who carries no driver's license card with him or whose penalty points of violation exceed a stipulated limit is mentioned in the foregoing description of the embodiment, the present invention enables also the prevention of the illegal driving in the cases when the date for renewal of the driver's license expires (a timepiece with a calendar is provided in the control circuit 15 for this purpose), and when the regulations on the vehicle class are violated, e.g. when a large-sized vehicle is driven with a license for a small-sized vehicle.

As described above, the present invention makes it impossible to run a vehicle in the cases when the driver's license card is not carried, when the stipulated limit of penalty points of violation is exceeded, when the date for renewal of a driver's license expires, when the regulations on the vehicle class is violated, and when a driver's license number set beforehand does not accord with the driver's license number of a driver, thus enabling the prevention of violation of traffic law and also improvement in the security of a vehicle. Moreover, it enables the quick and easy implementation of renewal and alteration of driver's licenses, registration of penalty points of violation, etc.

I claim:

1. In a driver license check system utilizing a card, a driver license check system comprising:
   a driver's license formed as an IC card having a storage means for storing pieces of information including an aggregate value of penalty points of said driver, and renewal data of said driver's license;

a driver's license card control means provided in a vehicle, said control means having a means for reading the aforesaid stored pieces of information on the driver's license; means for checking whether said aggregate value exceeds a stipulated value; and a means for deciding operations of devices in said vehicle in accordance with the result of the checking.

2. The driver license check system as claimed in claim 1, wherein the aforesaid operations of the devices in the vehicle are operations for starting an engine.

3. The driver license check system as claimed in claim 1, wherein the aforesaid pieces of information on the driver's license are read when said driver's license is set in the aforesaid control means.

4. The driver license check system as claimed in claim 1, wherein the aforesaid driver's license has a plane display means including liquid crystal display means for displaying the aforesaid stored pieces of information.

5. The driver license check system as claimed in claim 1, further comprising:

means for checking whether a driver's license number of a card set in said driver's license card controller matches a driver's license number of a person permitted to drive said vehicle, which is registered beforehand in a driver's license card controller.

6. The driver license check system as claimed in claim 1, further comprising:

means for checking whether the date for renewal of the driver's license card has expired.

7. The driver license check system as claimed in claim 5, wherein an engine starter release prohibiting condition created when said driver's license number on a card, and the driver's license number of the person permitted to drive the vehicle mismatch, is removed when the driver's license number registered beforehand in the driver's license card controller is inputted from a keyboard.

8. In a driver license check system utilizing a card, a method of a driver license check system comprising:

a step for storing pieces of information including an aggregate value of penalty points of said driver, and renewal data of said driver's license in a storage means provided in said driver's license;

a step for reading the aforesaid stored pieces of information on the driver's license by a driver's license card control means provided in a vehicle;

a step for checking whether or not said aggregate value exceeds a stipulated value; and a step for deciding operations of the devices in said vehicle in accordance with the result of this checking.

9. A driver license check system as claimed in claim 1, further comprising:

government authorized means for checking and writing said pieces of information to said storage means, said penalty points and said renewal data.

* * * * *